United States Patent
Asai

(10) Patent No.: US 10,907,554 B2
(45) Date of Patent: Feb. 2, 2021

(54) CONTROL DEVICE FOR INTERNAL COMBUSTION ENGINE AND CONTROL METHOD FOR INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 8 days.

(21) Appl. No.: 16/316,538

(22) PCT Filed: Jun. 29, 2017

(86) PCT No.: PCT/JP2017/024048
§ 371 (c)(1),
(2) Date: Jan. 9, 2019

(87) PCT Pub. No.: WO2018/012308
PCT Pub. Date: Jan. 18, 2018

(65) Prior Publication Data
US 2019/0293003 A1    Sep. 26, 2019

(30) Foreign Application Priority Data
Jul. 14, 2016   (JP) .................................. 2016-139575

(51) Int. Cl.
F02D 19/06    (2006.01)
F02D 41/00    (2006.01)
(Continued)

(52) U.S. Cl.
CPC .............. *F02D 19/10* (2013.01); *F02B 51/02* (2013.01); *F02D 19/0642* (2013.01);
(Continued)

(58) Field of Classification Search
CPC .............. F02D 41/0047; F02D 41/005; F02D 41/0052; F02D 41/0055; F02D 41/0057;
(Continued)

(56) References Cited

U.S. PATENT DOCUMENTS 4,230,072 A    10/1980   Noguchi et al.
6,131,388 A *  10/2000   Sasaki ................. F02D 41/0057
                                                      60/276

(Continued)

FOREIGN PATENT DOCUMENTS

DE    102012204649 A1 *  9/2013  ............. F02M 26/36
EP    2947299 A1         11/2015
(Continued)

OTHER PUBLICATIONS

International Search Report dated Aug. 15, 2017 issued in corresponding PCT Application PCT/JP2017/024048 cites the patent documents above.

(Continued)

*Primary Examiner* — Jacob M Amick
*Assistant Examiner* — Michael A Kessler
(74) *Attorney, Agent, or Firm* — Norton Rose Fulbright US LLP

(57) ABSTRACT

An internal combustion engine in which when the gas temperature of a fuel reformation chamber when a piston in a fuel reformation cylinder reaches the compression top dead point is estimated to be equal to or higher than a soot generation lower limit temperature set according to an equivalence ratio of the fuel reformation chamber, a reaction gas temperature adjusting operation for suppressing or reducing an increase in the reaction gas temperature in the fuel reformation chamber is executed. Further, a closing timing of an air-intake valve is changed to reduce an effective compression ratio of the fuel reformation chamber.

7 Claims, 6 Drawing Sheets

(51) Int. Cl.
    *F02M 26/17*     (2016.01)
    *F02M 21/02*     (2006.01)
    *F02D 19/10*     (2006.01)
    *F02B 51/02*     (2006.01)
    *F02M 27/02*     (2006.01)
    *F02M 31/16*     (2006.01)
    *F02M 25/00*     (2006.01)
    *B01J 19/00*     (2006.01)

(52) U.S. Cl.
    CPC ..... *F02D 19/0671* (2013.01); *F02D 41/0025* (2013.01); *F02M 21/02* (2013.01); *F02M 25/00* (2013.01); *F02M 26/17* (2016.02); *F02M 27/02* (2013.01); *F02M 31/16* (2013.01); *B01J 19/0013* (2013.01); *B01J 19/0026* (2013.01); *F02D 41/0027* (2013.01); *Y02T 10/30* (2013.01)

(58) Field of Classification Search
    CPC ............ F02D 41/0065; F02D 41/0067; F02D 41/025; F02D 19/0671; F02D 19/087; F02D 2041/007; F02M 26/36; F02M 27/02
    USPC .............................................. 123/3; 701/108
    See application file for complete search history.

(56) References Cited

U.S. PATENT DOCUMENTS

| | | | |
|---|---|---|---|
| 6,240,723 B1 * | 6/2001 | Ito | F02B 3/06 |
| | | | 123/568.21 |
| 7,954,472 B1 | 6/2011 | Sturman | |
| 2002/0031690 A1 | 3/2002 | Shimazu et al. | |
| 2009/0308070 A1 * | 12/2009 | Alger, II | F02D 13/0238 |
| | | | 60/602 |
| 2010/0174470 A1 | 7/2010 | Bromberg et al. | |
| 2010/0206249 A1 | 8/2010 | Bromberg et al. | |
| 2015/0369178 A1 * | 12/2015 | Asai | F02D 41/0025 |
| | | | 123/3 |
| 2017/0089273 A1 * | 3/2017 | Thomas | F02D 41/0027 |
| 2017/0089306 A1 | 3/2017 | Shimada et al. | |
| 2017/0284315 A1 * | 10/2017 | Asai | F02M 33/00 |
| 2019/0153965 A1 * | 5/2019 | Asai | F02D 19/02 |
| 2019/0226410 A1 * | 7/2019 | Asai | F02D 19/0607 |
| 2019/0234354 A1 * | 8/2019 | Asai | F02M 26/25 |
| 2019/0249626 A1 * | 8/2019 | Asai | F02D 19/0671 |
| 2019/0293012 A1 * | 9/2019 | Asai | F02D 19/0671 |
| 2019/0301382 A1 * | 10/2019 | Asai | F02D 45/00 |

FOREIGN PATENT DOCUMENTS

| | | | | |
|---|---|---|---|---|
| JP | 2002-160904 A | | 6/2002 | |
| JP | 2002-338207 A | | 11/2002 | |
| JP | 2003-090272 A | | 3/2003 | |
| JP | 2004284835 A | * | 10/2004 | |
| JP | 2006052662 A | * | 2/2006 | |
| JP | 2006-226227 A | | 8/2006 | |
| JP | 2007332891 A | * | 12/2007 | |
| JP | 2010038012 A | * | 2/2010 | |
| JP | 2014-136978 A | | 7/2014 | |
| JP | 2015-218676 A | | 12/2015 | |
| JP | 2016166611 A | * | 9/2016 | |
| JP | 2016194294 A | * | 11/2016 | |
| WO | 2015/178327 A1 | | 11/2015 | |
| WO | 2016/035735 A1 | | 3/2016 | |

OTHER PUBLICATIONS

European Search Report dated Jun. 6, 2019 issued in corresponding EP Application 17827438.7 cites the patent documents above.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024048, filed on Jun. 29, 2017 which claims priority under 35 U.S.C. § 119 to Japanese Patent Application No. 2016-139575 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method applied to an internal combustion engine including a fuel reformation cylinder capable of functioning as a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount can therefore be reduced. Further, since a fuel with a high anti-knock property is combusted, knocking is suppressed or reduced, and since diesel micropilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

When the reformed fuel is generated in the fuel reformation cylinder as is described hereinabove, the equivalence ratio in the fuel reformation cylinder is set high so as to enable reforming reaction while suppressing or reducing oxidation reaction (combustion).

Further, the amount of fuel supplied to the fuel reformation cylinder is changed according to the engine load. In other words, during a low-load operation of the internal combustion engine, the amount of fuel supplied to the fuel reformation cylinder is small. When the fuel supply amount to the fuel reformation cylinder is reduced, the equivalence ratio in the fuel reformation cylinder may approach (drop to) 1. In such a situation, the amount of the oxidation reaction (combustion amount) of the fuel in the fuel reformation cylinder increases. This increases the quantity of heat generated, consequently raising the temperature (reaction gas temperature) in the fuel reformation cylinder.

FIG. 4 shows a reforming reaction possible range, a reforming reaction disabled range, a range in which soot (carbon particles) is generated within the reforming reaction possible range, where the vertical axis indicates an equivalence ratio in the fuel reformation cylinder and the horizontal axis indicates a reaction gas temperature in the fuel reformation cylinder. In other words, in cases where the equivalence ratio and the reaction gas temperature in the fuel reformation cylinder are in the soot generation range, a relatively large amount of soot is present in the reformed fuel generated.

During a medium-load operation or a high-load operation of the internal combustion engine (an operation range in which the equivalence ratio in the fuel reformation cylinder is relatively high), if the engine load drops and the equivalence ratio in the fuel reformation cylinder approaches 1 from a state where the equivalence ratio and the reaction gas temperature in the fuel reformation cylinder are at point A in the figure (a point within the reforming reaction possible range, but outside the soot generation range), the reaction gas temperature in the fuel reformation cylinder increases with an increase in the oxidation reaction amount (see the arrow I in FIG. 4). If the equivalence ratio and the reaction gas temperature in the fuel reformation cylinder in this case reaches a point B (a point within the soot generation range), a relatively large amount of soot will be contained in the reformed fuel generated, and this soot will be led out toward the output cylinder.

In such a situation where the soot is led out, combustion of reformed fuel in the output cylinder may be negatively affected. If the soot is not processed in the output cylinder, the soot may be emitted to the atmosphere.

The present invention is made in view of the above problems, and it is an object of the present invention to provide a control device and a control method for an internal combustion engine having a fuel reformation cylinder and an output cylinder, the control device and the control method capable of suppressing or reducing soot generated in the fuel reformation cylinder.

Solution to Problem

A solution of the present invention to achieve the above-described object premises a control device to be applied to an internal combustion engine including a fuel reformation cylinder capable of serving as a fuel reformation device and an output cylinder to which reformed fuel generated in the fuel reforming cylinder is supplied, the output cylinder configured to yield an engine power by combusting the reformed fuel. Such a control device of the internal combustion engine includes a reaction gas temperature adjustment unit configured to adjust a reaction gas temperature in the fuel reformation cylinder according to an equivalence ratio in the fuel reformation cylinder so that the equivalence ratio and the reaction gas temperature in the fuel reformation cylinder at a time of fuel reformation are in a reforming reaction possible range but outside a soot generation range, the soot generation range being defined by the equivalence ratio and the reaction gas temperature in the fuel reformation cylinder.

With this, the reaction gas temperature adjustment unit adjusts the reaction gas temperature according to the equivalence ratio of the fuel reformation cylinder, and the equivalence ratio and the reaction gas temperature of the fuel reformation cylinder are set outside the soot generation range within the reforming reaction possible range. Therefore, reformed fuel can be generated while suppressing or reducing generation of soot in the fuel reformation cylinder. As a result, a soot-caused negative effect to combustion of reformed fuel in the output cylinder, or emission of soot into the atmosphere can be suppressed or reduced.

Further, the reaction gas temperature adjustment unit is preferably configured to change a control amount of control to suppress or reduce an increase in the reaction gas temperature of the fuel reformation cylinder caused by the equivalence ratio of the fuel reformation cylinder dropping to approach 1, and configured to increase the control amount as the equivalence ratio of the fuel reformation cylinder approaches 1.

As described above, as the equivalence ratio in the fuel reformation cylinder drops and approaches 1, the amount of the oxidation reaction of the fuel in the fuel reformation cylinder increases, and the reaction gas temperature in the fuel reformation cylinder increases. Therefore, the equivalence ratio and the reaction gas temperature in the fuel reformation cylinder during the fuel reformation are highly likely to enter the soot generation range. In the present solution, the control amount (control variable of control for suppressing or reducing an increase in the reaction gas temperature in the fuel reforming cylinder) increases as the equivalence ratio in the fuel reformation cylinder approaches 1, so as to suppress or reduce an increase in the reaction gas temperature in the fuel reformation cylinder. Thus, the equivalence ratio and the reaction gas temperature in the fuel reformation cylinder during the fuel reformation are in the reforming reaction possible range but outside the soot generation range. As a result, it is possible to suppress or reduce generation of soot in the fuel reformation cylinder.

Further, the reaction gas temperature adjustment unit is preferably configured to adjust the reaction gas temperature in the fuel reformation cylinder by adjusting at least one of an amount of exhaust gas from the output cylinder recirculated to the fuel reformation cylinder and the temperature of the exhaust gas recirculated.

Further, the reaction gas temperature adjustment unit may be configured to adjust the reaction gas temperature in the fuel reformation cylinder, by adjusting effective compression ratio of the fuel reformation cylinder.

As described above, the reaction gas temperature in the fuel reformation cylinder can be adjusted by adjusting any of: an amount of exhaust gas from the output cylinder recirculated to the fuel reformation cylinder; the temperature of the exhaust gas recirculated; and the effective compression ratio of the fuel reformation cylinder. The gas temperature in the fuel reformation cylinder is adjusted so that the equivalence ratio and the reaction gas temperature in the fuel reformation cylinder during the fuel reformation are in the reforming reaction possible range but outside the soot generation range. This way, generation of soot in the fuel reformation cylinder can be suppressed or reduced.

Further, the fuel reforming operation in the fuel reformation cylinder is preferably not executed, if the equivalence ratio and the reaction gas temperature of the fuel reformation cylinder at the time of fuel reformation are estimated as to be in the soot generation range even when the control amount of the control to suppress or reduce an increase in the reaction gas temperature in the fuel reformation cylinder reaches a limit value of a controllable range.

With the above structure, the fuel reforming operation in the fuel reformation cylinder is not executed determining that the soot cannot be suppressed or reduced by the control performed by the reaction gas temperature adjustment unit. For example, fuel supply to the fuel reformation cylinder is stopped. By running out the fuel which is the source of generating the soot, generation of soot in the fuel reformation cylinder can be avoided.

Further, the scope of the technical thought of the present invention encompasses a control method for the internal combustion engine implemented by the control device for the internal combustion engine according to each of the above described solutions. Namely, it is premised that a control method is applied to an internal combustion engine includes a fuel reformation cylinder capable of serving as a fuel reformation device and an output cylinder to which reformed fuel generated in the fuel reforming cylinder is supplied, the output cylinder configured to yield an engine power by combusting the reformed fuel. In such a control method of the internal combustion engine, a reaction gas temperature in the fuel reformation cylinder is adjusted according to an equivalence ratio in the fuel reformation cylinder so that the equivalence ratio and the reaction gas temperature in the fuel reformation cylinder at a time of fuel reformation are in a reforming reaction possible range but outside a soot generation range, the soot generation range being defined by the equivalence ratio and the reaction gas temperature in the fuel reformation cylinder.

With this control method, reformed fuel can be generated while suppressing or reducing generation of soot in the fuel reformation cylinder, as is hereinabove described. As a result, a soot-caused negative effect to combustion of reformed fuel in the output cylinder, or emission of soot into the atmosphere can be suppressed or reduced.

Advantageous Effects of Invention

The present invention adjusts a reaction gas temperature in the fuel reformation cylinder according to an equivalence ratio of the fuel reformation cylinder, so that the equivalence ratio and the reaction gas temperature in the fuel reformation cylinder during the fuel reformation are in the reforming reaction possible range but outside the soot generation range. Therefore, reformed fuel can be generated while suppressing or reducing generation of soot in the fuel reformation cylinder. As a result, a soot-caused negative effect to combustion of reformed fuel in the output cylinder, or emission of soot into the atmosphere can be suppressed or reduced.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
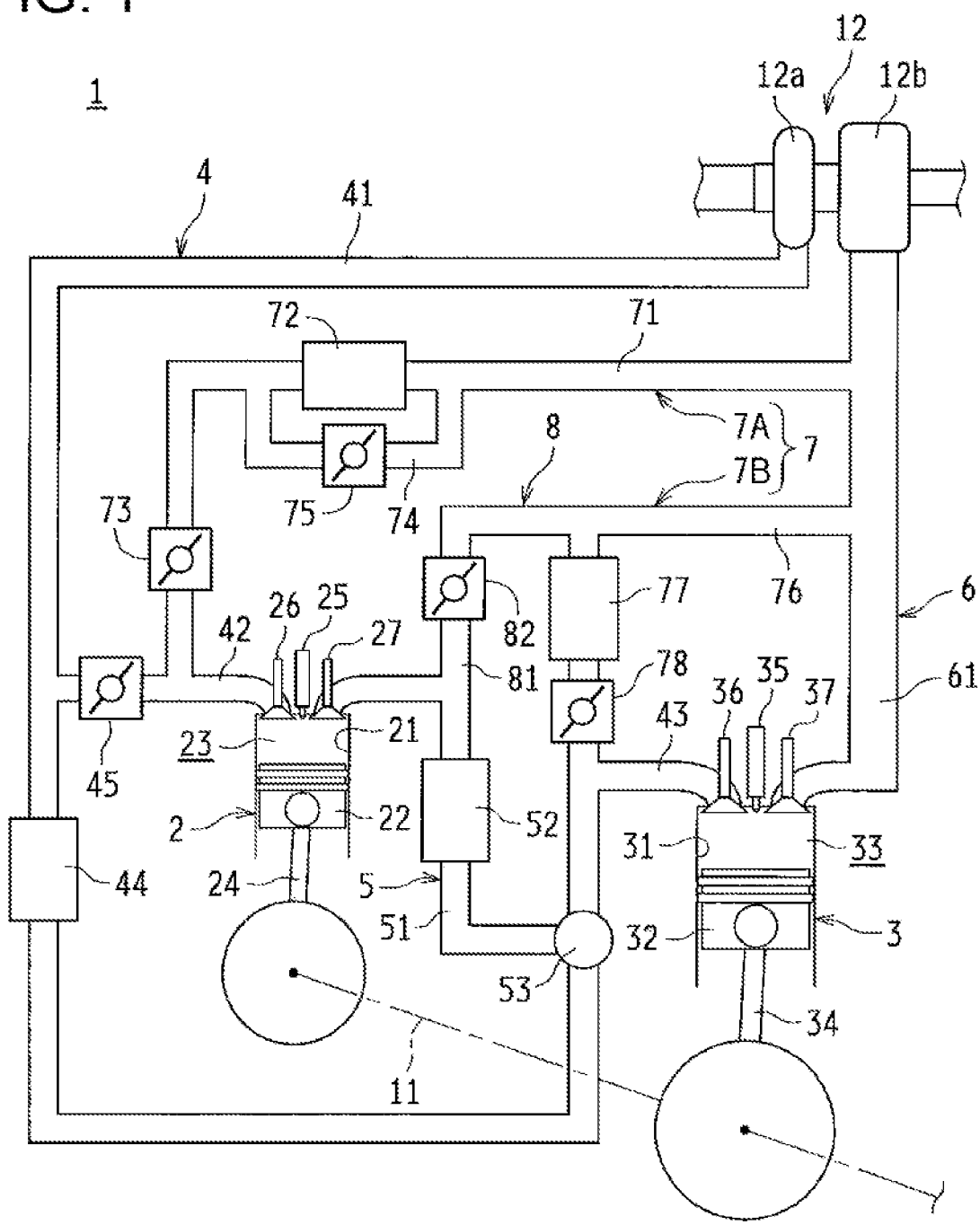
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture is performed in the combustion chamber 33. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12*b* of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76. The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
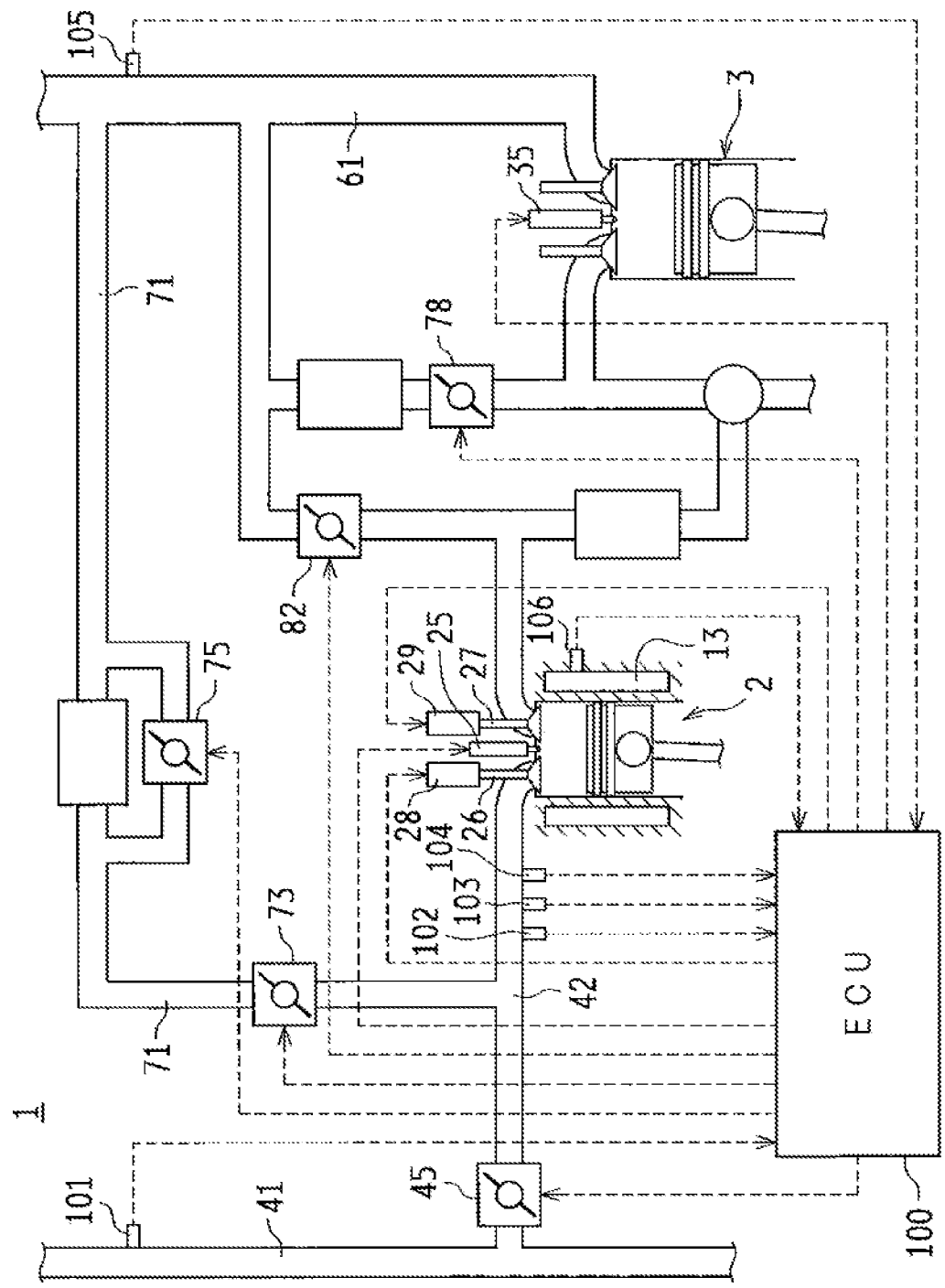
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes an intake-air flow sensor 101, a taken-in gas pressure sensor 102, a taken-in gas temperature sensor 103, a taken-in gas 02 sensor 104, an exhaust pressure sensor 105, a water temperature sensor 106, and the like.

The intake-air flow sensor 101 transmits, to the ECU 100, an output signal corresponding to the flow rate of the taken-in air (air) flowing in the main air-intake passage 41.

The taken-in gas pressure sensor 102 transmits, to the ECU 100, an output signal corresponding to the pressure of the taken-in gas flowing in the fuel reformation cylinder air-intake passage 42. Specifically, an output signal corresponding to the pressure of the taken-in gas in the fuel reformation cylinder air-intake passage 42, on the downstream side of a portion communicating with the fuel reformation cylinder EGR passage 71 is transmitted to the ECU 100.

The taken-in gas temperature sensor 103 transmits, to the ECU 100, an output signal corresponding to the temperature of the taken-in gas flowing in the fuel reformation cylinder air-intake passage 42. Specifically, an output signal corresponding to the taken-in gas temperature of the fuel reformation cylinder air-intake passage 42, on the downstream side of a portion communicating with the fuel reformation cylinder EGR passage 71 is transmitted to the ECU 100.

The taken-in 02 sensor 104 transmits, to the ECU 100, an output signal corresponding to the concentration of oxygen in the taken-in gas flowing in the fuel reformation cylinder air-intake passage 42. Specifically, an output signal corresponding to the oxygen concentration in the taken-in gas in the fuel reformation cylinder air-intake passage 42, on the downstream side of a portion communicating with the fuel reformation cylinder EGR passage 71 is transmitted to the ECU 100.

The exhaust pressure sensor 105 transmits, to the ECU 100, an output signal corresponding to the pressure of the exhaust gas flowing in the exhaust passage 61. Specifically, an output signal corresponding to the exhaust pressure of the exhaust passage 61 on the upstream side of the portion communicating with the fuel reformation cylinder EGR passage 71 is transmitted to the ECU 100.

The water temperature sensor 106 transmits, to the ECU 100, an output signal corresponding to the temperature of the cooling water flowing in the cooling water passage 13 formed in the cylinder block. Specifically, an output signal corresponding to the temperature of the cooling water flowing in the cooling water passage 13 formed around the fuel reformation cylinder 2 is transmitted to the ECU 100.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Based on the output signals from the above described various sensors 101 to 106 and the like, the ECU 100 performs: fuel injection control of the injectors 25, 35 (opening and closing control of the injectors 25, 35); opening and closing control of the adjustment valves 45, 73, 75, 78, 82 (gas flow rate control), and opening and closing timing control of the valves 26, 27 by variable valve units 28, 29.

—Basic Operation of Internal Combustion Engine—

Next, a basic operation of the internal combustion engine 1 configured as described above will be described.

In a basic operation after completion of warming up the internal combustion engine 1 (in a state enabling a reforming reaction of the fuel in the fuel reformation chamber 23), the air introduced into the main air-intake passage 41 is pressurized by the compressor wheel 12a of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lower limit value of a reforming reaction enabling temperature, according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Also, a part of the engine power is used as a drive source for the reciprocating movement of the piston 22 in the fuel reformation cylinder 2.

Further, at a time of cold start of the internal combustion engine 1, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Through the above, compressed ignition combustion takes place in each of the fuel reformation chamber 23 of the fuel reformation cylinder 2 and the combustion chamber 33 of the output cylinder 3. Then, when the warm-up of the fuel reformation cylinder 2 proceeds and the temperature reaches a temperature that enables the reforming reaction, the operation is switched to an operation for generating the reformed fuel (fuel reforming operation). As described above, the fuel reformation cylinder 2 can function as a cylinder for obtaining an engine power as in the case of the output cylinder 3, and can function as a fuel reformation device as hereinabove described.

At the time of stopping supply of the reformed fuel to the output cylinder 3 due to emergency stop and the like of the internal combustion engine 1, the bypass amount adjusting valve 82 is opened. This introduces the reformed fuel into the exhaust passage 61 via the output cylinder bypass passage 81, and stops supply of the reformed fuel to the output cylinder 3.

With this internal combustion engine 1, combustion (uniform lean combustion) of the lean mixture is performed in the output cylinder 3. The NOx emission amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
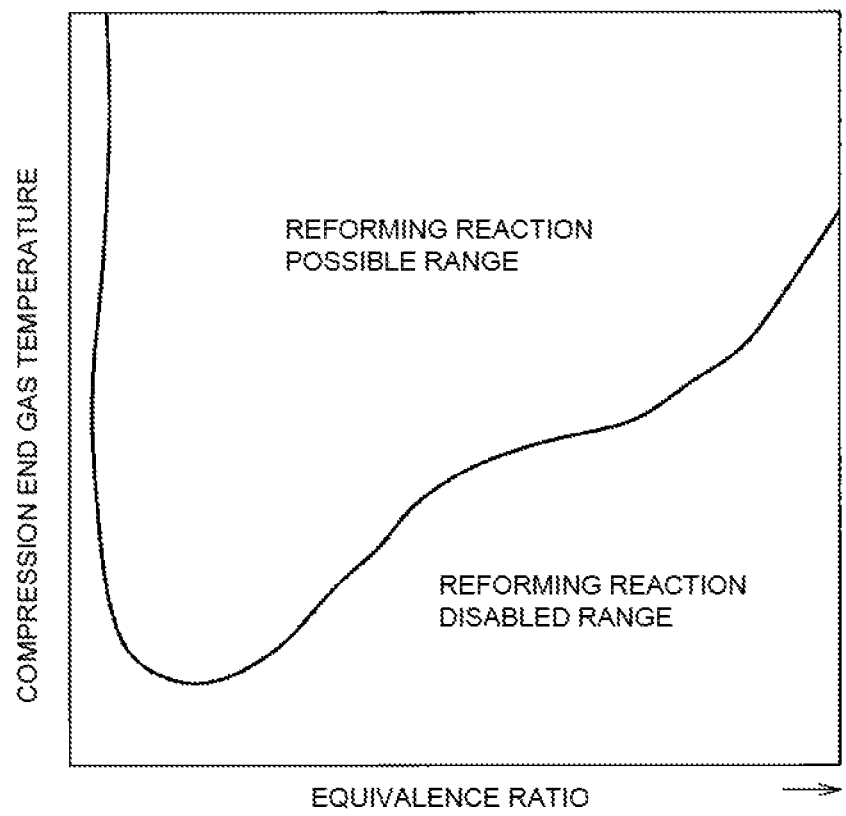
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming reaction in the fuel reformation chamber 23, an equivalent ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Control of Fuel Reforming Operation—

Next, the following describes control of the fuel reforming operation, which is a characteristic of the present embodiment. As hereinabove described, when the reformed fuel is generated in the fuel reformation cylinder 2, the equivalence ratio in the fuel reformation chamber 23 is set high so as to enable reforming reaction while suppressing or reducing oxidation reaction (combustion). Further, the amount of fuel supplied to the fuel reformation chamber 23 is changed according to the engine load. In other words, during a low-load operation of the internal combustion engine 1, the amount of fuel supplied to the fuel reformation chamber 23 is small. When the fuel supply amount to the fuel reformation chamber 23 is reduced, the equivalence ratio in the fuel reformation chamber 23 may approach (drop to) 1. In such a situation, the amount of the oxidation reaction (combustion amount) of the fuel in the fuel reformation chamber 23 increases. This increases the quantity of heat generated, consequently raising the temperature (reaction gas temperature) in the fuel reformation chamber 23.

As described hereinabove with reference to FIG. 4, during a medium-load operation or a high-load operation of the internal combustion engine 1, if the engine load drops and the equivalence ratio in the fuel reformation chamber 23 approaches 1 from a state where the equivalence ratio and the reaction gas temperature in the fuel reformation chamber 23 are at point A in the figure, the reaction gas temperature in the fuel reformation chamber 23 increases with an increase in the oxidation reaction amount (see the arrow I in FIG. 4). If the equivalence ratio and the reaction gas temperature in the fuel reformation chamber 23 in this case reaches a point B (a point within the soot generation range), a relatively large amount of soot will be contained in the reformed fuel generated, and this soot will be led out toward the output cylinder 3. In such a situation where the soot is led out, combustion of reformed fuel in the combustion chamber 33 may be negatively affected. If the soot is not processed in the combustion chamber 33, the soot may be emitted to the atmosphere.

In view of the above problem, in the present embodiment, a reaction gas temperature in the fuel reformation chamber 23 is adjusted according to an equivalence ratio in the fuel reformation chamber 23 so that the equivalence ratio and the reaction gas temperature in the fuel reformation chamber 23 at a time of fuel reformation are in a reforming reaction possible range but outside a soot generation range, the soot generation range being defined by the equivalence ratio and the reaction gas temperature in the fuel reformation chamber 23.

Specifically, a soot generation lower limit temperature is set according to an equivalence ratio of the air-fuel mixture in the fuel reformation chamber 23. The soot generation lower limit temperature is set for each equivalence ratio of the air-fuel mixture and is a lower limit value of the reaction gas temperature at which soot is generated in the corresponding equivalence ratio.

When the gas temperature (compression end gas temperature) of the fuel reformation chamber 23 when the piston 22 in the fuel reformation cylinder 2 reaches the compression top dead point is estimated as to be equal to or higher than the soot generation lower limit temperature, i.e., when the reaction gas temperature (corresponding to the compression end gas temperature) during the reforming reaction is estimated as to enter the soot generation range with the current equivalence ratio, a reaction gas temperature adjusting operation is executed for suppressing or reducing an increase in the reaction gas temperature of the fuel reformation chamber 23 (increase in the reaction gas temperature attributed to the equivalence ratio of the fuel reformation chamber 23 approaching 1). Thus, the equivalence ratio and the reaction gas temperature in the fuel reformation chamber 23 during the fuel reformation are in the reforming reaction possible range but outside the soot generation range. This is specifically described hereinbelow.

In the control of the fuel reforming operation in the present embodiment, the estimated actual compression end gas temperature is compared with the soot generation lower limit temperature.

When the actual compression end gas temperature is estimated to be lower than the soot generation lower limit temperature, the fuel reforming operation of the fuel reformation cylinder 2 is executed (the fuel reforming operation is executed without the reaction gas temperature adjusting operation) in that cycle (or in the subsequent cycle). In other words, fuel is supplied from the injector 25 to the fuel reformation chamber 23 (fuel is supplied to set a high equivalence ratio in the fuel reformation chamber 23 for enabling the reforming reaction).

When the actual compression end gas temperature is estimated to be equal to or higher than the soot generation lower limit temperature, the reaction gas temperature adjusting operation for suppressing or reducing an increase in the reaction gas temperature of the fuel reformation chamber 23 is executed, while the fuel reforming operation of the fuel reformation cylinder 2 is executed in that cycle (or in the subsequent cycle).

In the following, an operation of calculating an actual compression end gas temperature (estimating operation), an operation of setting the soot generation lower limit temperature (soot generation lower limit temperature set based on the equivalence ratio), and control of the fuel reforming operation using the actual compression end gas temperature and the soot generation lower limit temperature are described in this order.

(Operation of Calculating Compression End Gas Temperature)

First, the operation of calculating the actual compression end gas temperature (estimating operation) will be described.

The actual compression end gas temperature in the fuel reformation chamber 23 can be calculated (estimated) by the following formula (1).

[Formula 1]

$$T_{TDC} = C_{react} \cdot T_{ini} \cdot \varepsilon^{\kappa-1} \tag{1}$$

In the formula (1), $T_{TDC}$ is the compression end gas temperature, $T_{ini}$ is the gas temperature before the compression; i.e., the taken-in gas temperature, c is the effective compression ratio of the fuel reformation cylinder 2, $\kappa$ is the polytropic number of the taken-in gas in the fuel reformation chamber 23, and $C_{react}$ is a correction coefficient taking into consideration an increase in the temperature associated with a reforming reaction (in particular, partial oxidation reaction) in the fuel reformation chamber 23 (an increase in the temperature due to a reforming reaction when the piston 22 reaches the compression top dead point).

The following describes, calculation of each parameter in the formula (1).

(Intake-Gas Temperature $T_{ini}$)

The taken-in gas temperature $T_{ini}$ is calculated based on the output signal from the taken-in gas temperature sensor 103. The taken-in gas temperature $T_{ini}$ calculated here is the temperature of the taken-in gas on the downstream side of a portion of the fuel reformation cylinder EGR passage 71 communicating with the fuel reformation cylinder air-intake passage 42.

Alternatively, the temperature of the taken-in gas flowing through the air-intake port of the fuel reformation cylinder 2 may be adopted as the taken-in gas temperature $T_{ini}$, instead of the temperature of the taken-in gas flowing through the fuel reformation cylinder air-intake passage 42. Alternatively, the gas temperature in the fuel reformation chamber 23 at the time when the piston 22 reaches the intake bottom dead point or the gas temperature in the fuel reformation chamber 23 at the time when the air-intake valve 26 is closed may be detected or estimated, and used as the taken-in gas temperature $T_{ini}$.

(Effective Compression Ratio $\varepsilon$ of Fuel Reformation Cylinder)

An effective compression ratio $\varepsilon$ of the fuel reformation cylinder 2 is calculated as a ratio of a volume of the fuel reformation chamber 23 at a time point when the air-intake valve 26 in the fuel reformation cylinder 2 is closed and a volume of the fuel reformation cylinder 23 at a time point when the piston 22 reaches the compression top dead point. The effective compression ratio c of the fuel reformation cylinder 2 may be obtained simply on a basis of the ratio of the volume of the fuel reformation chamber 23 when the piston 22 is at the bottom dead point and the volume of the fuel reformation chamber 23 when the piston 22 is at the top dead point (apparent compression ratio).

(Polytropic Number $\kappa$)

The polytropic number $\kappa$ is defined as a ratio of a specific heat at constant pressure and a specific heat at constant volume in the gas compression stroke in the fuel reformation chamber 23. When the total amount of taken-in gas is air and there is no heat outflow to the cylinder wall surface, $\kappa$=about 1.4. However, since the actual polytropic number of the taken-in gas in the fuel reformation chamber 23 differs from that in cases where the total amount is air or where there is no heat outflow. Therefore, the polytropic number is modified as described below.

To the polytropic number $\kappa$ in the formula (1), a polytropic number obtained through any one of: modification based on the cooling water temperature, modification based on the gas composition, and modification of the equivalence ratio. Alternatively, a polytropic number obtained through a combination of two or more of these modifications may be applied to the polytropic number $\kappa$ in the formula (1).

Modification of Polytropic Number Based on Cooling Water Temperature

The polytropic number $\kappa$ varies according to the amount of heat loss. As described above, the cooling water passage 13 is formed in the cylinder block, and there is a heat outflow toward the cooling water flowing through the cooling water passage 13. Therefore, the amount of heat loss can be predicted by calculating the temperature of the cooling water based on the output from the water temperature sensor 106. Alternatively, by grasping the relationship between the cooling water temperature and the amount of heat loss in advance, the amount of heat loss can be estimated from the cooling water temperature.

Figure 5:
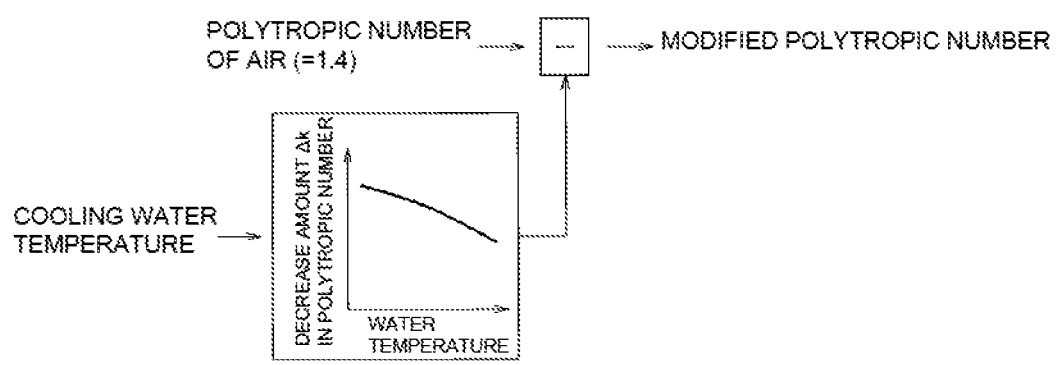
FIG. 5 A block diagram showing arithmetic logic of a modified polytropic number based on the cooling water temperature.

FIG. 5 is a block diagram showing arithmetic logic of a modified polytropic number based on the cooling water temperature. As shown in FIG. 5, a decrease amount $\Delta\kappa$ in the polytropic number is evaluated from the cooling water temperature calculated based on the output from the water temperature sensor 106. By subtracting this decrease amount from the polytropic number of the air, the modified polytropic number corresponding to the cooling water temperature (corresponding to the heat loss amount) can be obtained.

Modification of Polytropic Number Based on Gas Composition

The polytropic number $\kappa$ also varies according to the gas composition in the fuel reformation chamber 23. That is, when the intake-gas is entirely the air, most of the taken-in gas is 2 atomic molecules, and the polytropic number $\kappa$ is about "1.4". On the other hand, if the intake-gas contains burned gas ($CO_2$ or $H_2O$) or a fuel, the ratio of the 2 atomic molecules decreases, and so does the polytropic number κ.

Therefore, based on an output signal from the taken-in gas 02 sensor 104, a mole fraction of carbon dioxide in the taken-in gas is calculated based on the mole fraction of oxygen in the intake-gas. Then, the polytropic number is estimated based on the mole fraction of each gas component.

For example, a molar specific heat at constant pressure of the taken-in gas is first determined according to the following formula (2).

[Formula 2]
$$C_{p\_intake} = \sum_i \psi_i \cdot C_{p\_i} \qquad (2)$$

In the formula (2), $C_{p\_\#intake}$ is the molar specific heat at constant pressure of the taken-in gas, $\psi_i$ is the mole fraction of each gas component, and $C_{p\_\#1}$ is the molar specific heat at constant pressure of each gas component. The mole fraction $\Psi_i$ of each gas component and the molar specific heat at constant pressure $C_{p\_\#i}$ of each gas component are determined according to the type of fuel, the equivalence ratio (current equivalence ratio) of the fuel reformation chamber 23, and the like, and can be obtained according to the map (map stored in the ROM) created based on an experiment or a simulation.

Thus, the polytropic number κ of the taken-in gas can be calculated with the following formula (3).

[Formula 3]
$$\kappa = \frac{C_{p\_intake}}{C_{p\_intake} - 8.314} \qquad (3)$$

This way, the modified polytropic number corresponding to the gas composition can be obtained.

Modification of Polytropic Number Based on Equivalence Ratio

By estimating the equivalence ratio in the fuel reformation chamber 23, the polytropic number κ can be also obtained through correcting calculation from that equivalence ratio.

Figure 6:
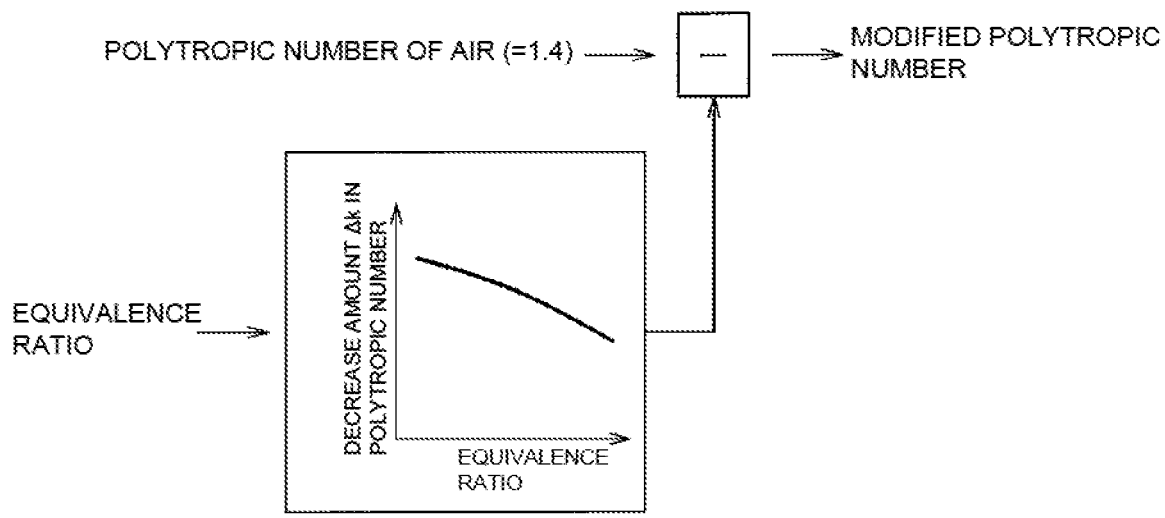
FIG. 6 A block diagram showing arithmetic logic of a modified polytropic number based on the equivalence ratio.

FIG. 6 is a block diagram showing arithmetic logic of a modified polytropic number based on the equivalence ratio. As shown in FIG. 6, a decrease amount Δκ in the polytropic number is evaluated from the equivalence ratio. By subtracting this decrease amount from the polytropic number of the air, the modified polytropic number corresponding to the equivalence ratio can be obtained.

A method of calculating the equivalence ratio in this case is as follows. Namely, the flow rate of the taken-in air is calculated based on the output signal from the intake-air flow sensor 101. Further, an EGR gas amount (an amount of EGR gas introduced into the fuel reformation cylinder 2) is calculated from a difference between the pressure of the taken-in gas calculated based on the output signal from the taken-in gas pressure sensor 102 and the pressure of the exhaust gas calculated based on the output signal from the exhaust pressure sensor 105. The equivalence ratio is calculated from the flow rate of the taken-in air, the EGR gas amount, and the fuel supply amount to the fuel reformation chamber 23 (i.e., the fuel supply amount evaluated from an injection command value to the injector 25). In cases of not considering the EGR gas amount, the equivalence ratio may be calculated from a ratio of the flow rate of the taken-in air calculated based on the output signal from the intake-air flow sensor 101 and the fuel supply amount to the fuel reformation chamber 23.

(Correction Coefficient $C_{react}$ of Increase in Temperature Associated with Reforming Reaction)

The correction coefficient $C_{react}$ for an increase in the temperature associated with the reforming reaction is for correcting the compression end gas temperature by the amount of increase in the gas temperature due to the partial oxidation reaction, in cases where the reforming reaction is started before the piston 22 reaches the compression top dead point. Therefore, as described above, when the equivalence ratio in the fuel reformation chamber 23 approaches 1, the correction coefficient $C_{react}$ will be larger, with an increase in the amount of the oxidation reaction in the fuel reformation chamber 23. In other words, the correction coefficient $C_{react}$ is a value representing an inclination of an arrow in FIG. 4 (a ratio of a change in the reaction gas temperature for a change in the equivalence ratio).

This correction coefficient $C_{react}$ can be calculated using, as parameters, the temperature in the fuel reformation chamber 23 (the temperature of the reaction field), the oxygen concentration in the fuel reformation chamber 23, the fuel concentration in the fuel reformation chamber 23, and the like. By determining the start time of the reforming reaction and the heat generation quantity by the partial oxidation reaction for the operating condition through an experiment or the like, a temperature increase amount correction coefficient $C_{react}$ is stored in the ROM so that the temperature increase amount correction coefficient $C_{react}$ according to the actual operating condition can be retrieved.

Further, when the reforming reaction is not yet started when the piston 22 reaches the compression top dead point, or when the heat generation quantity by the reforming reaction is relatively small when the piston 22 reaches the compression top dead point, the temperature increase amount correction coefficient $C_{react}$ may be set to "1" in the formula (1).

(Setting Operation of Soot Generation Lower Limit Temperature)

Next, the setting operation of the soot generation lower limit temperature is described. As described above, the soot generation lower limit temperature is set based on the equivalence ratio of the air-fuel mixture. That is, as is obvious from FIG. 4, for a different equivalence ratio of the air-fuel mixture, the value of the soot generation lower limit temperature (boundary value on the low-temperature side for the soot generation range in FIG. 4) will be different.

Figure 7:
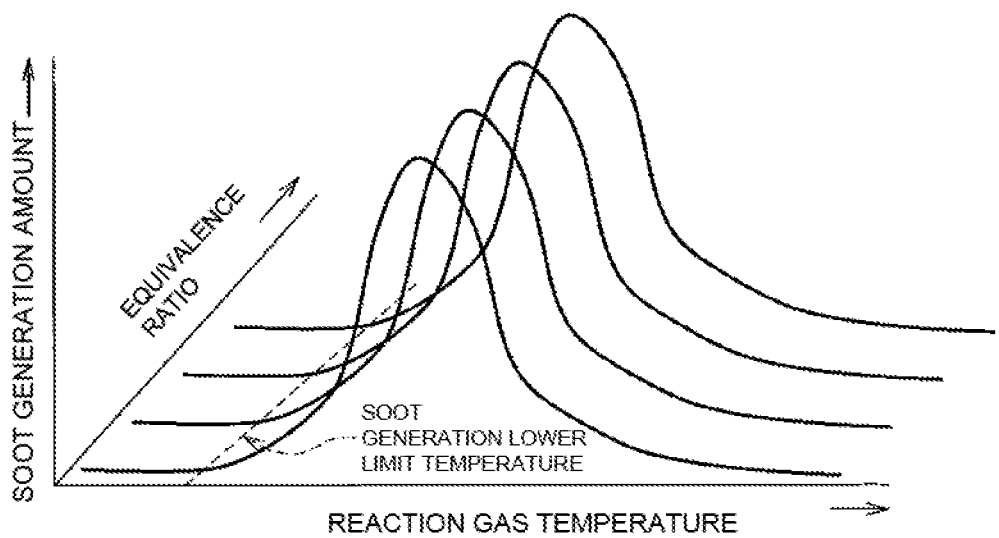
FIG. 7 A diagram showing a relationship among the equivalence ratio, the reaction gas temperature, and an amount of soot generated in the fuel reformation chamber.

The soot generation lower limit temperature can be obtained by using the equivalence ratio of the fuel reformation chamber 23 as a parameter. FIG. 7 is a diagram showing a relationship among the equivalence ratio, the reaction gas temperature in the fuel reformation chamber 23, and an amount of soot generated in the fuel reformation chamber 23. As shown in FIG. 7, even if the equivalence ratio in the fuel reformation chamber 23 is constant, the amount of generated soot will rapidly increase, if the reaction gas temperature in the fuel reformation chamber 23 is equal to or higher than a certain value. This temperature (a temperature at which the amount of generated soot is rapidly increases) is the soot generation lower limit temperature. The soot generation lower limit temperature is lowered with a decrease in the equivalence ratio in the fuel reformation chamber 23. As described above, the soot generation lower limit temperature can be obtained, as a value corresponding to an equivalence ratio in the fuel reformation chamber 23, based on a map (map stored in the ROM) or an arithmetic expression which are created based on an experiment or a simulation.

As described, the soot generation lower limit temperature corresponds to the lower limit temperature of the soot generation range defined by the equivalence ratio and the reaction gas temperature in the fuel reformation cylinder.

(Reaction Gas Temperature Adjusting Operation)

There are following 2 types of reaction gas temperature adjusting operations for suppressing or reducing an increase in the reaction gas temperature of the fuel reformation chamber 23 described above. When the actual compression end gas temperature is estimated as to be equal to or higher than the soot generation lower limit temperature and estimated to be in the soot generation range, at least one of the reaction gas temperature adjusting operations is selected and executed. The following describes each of the reaction gas temperature adjusting operations.

First Adjusting Operation

The following describes a first adjusting operation. In the first adjusting operation, the reaction gas temperature is adjusted by adjusting the flow rate and the temperature of the EGR gas introduced to the fuel reformation chamber 23 through the fuel reformation cylinder EGR system 7A.

In this first adjusting operation, the opening degrees of the EGR gas amount adjusting valve 73 and the bypass amount adjusting valve 75 are adjusted.

For example, by increasing the opening degree of the EGR gas amount adjusting valve 73, the amount of EGR gas introduced to the fuel reformation chamber 23 (i.e., an amount of exhaust gas discharged from the output cylinder recirculated to the fuel reformation cylinder in the present invention) is increased. Thus, an amount of inert gas introduced to the fuel reformation chamber 23 is increased, and an equivalence ratio for the same fuel supply amount can be higher. Further, by increasing the amount of EGR gas introduced into the fuel reformation chamber 23, the amount of the 3-atom molecules ($CO_2$, $H_2O$) introduced into the fuel reformation chamber 23 is increased. Therefore, the polytropic number κ of the taken-in gas is lowered, and the compression end gas temperature $T_{TDC}$ is lowered.

Further, by reducing the opening degree of the bypass amount adjusting valve 75 (increasing the amount of EGR gas flowing through the EGR gas cooler 72), the temperature of the EGR gas introduced into the fuel reformation chamber 23 (the temperature of the exhaust gas discharged from the output cylinder and recirculated to the fuel reformation cylinder, in the present invention) is lowered.

Thus, the equivalence ratio and the reaction gas temperature in the fuel reformation chamber 23 during the fuel reformation are in the reforming reaction possible range but outside the soot generation range. In other words, by increasing the opening degree of the EGR gas amount adjusting valve 73 (by increasing the control amount of the control of the present invention for suppressing or suppressing or reducing an increase in the temperature of the reaction gas in the fuel reformation cylinder), the reaction gas temperature is lowered due to an increase in the amount of the EGR gas. Further, by reducing the opening degree of the bypass amount adjusting valve 75 (by increasing the control amount of the control of the present invention for suppressing or suppressing or reducing an increase in the temperature of the reaction gas in the fuel reformation cylinder), the reaction gas temperature is lowered due to a drop in the temperature of the EGR gas. This way, it is possible to suppress or reduce generation of soot in the fuel reformation chamber 23.

In the first adjusting operation, only one of the opening degree of the EGR gas amount adjusting valve 73 and the opening degree of the bypass amount adjusting valve 75 may be adjusted. That is, the amount of EGR gas introduced to the fuel reformation chamber 23 may be increased by increasing the opening degree of the EGR gas amount adjusting valve 73, without changing the opening degree of the bypass amount adjusting valve 75. Alternatively, the temperature of EGR gas introduced to the fuel reformation chamber 23 may be lowered by reducing the opening degree of the bypass amount adjusting valve 75, without changing the opening degree of the EGR gas amount adjusting valve 73.

Second Adjusting Operation

The following describes a second adjusting operation. In the second adjusting operation, the reaction gas temperature is adjusted by reducing the effective compression ratio of the fuel reformation cylinder 2.

In the second adjusting operation, the closing timing of the air-intake valve 26 is corrected to the retarded angle side. In other words, the air-intake valve 26 is closed at the retarded angle side relative to the timing of the piston 22 reaching the intake bottom dead point, thereby reducing the effective compression ratio of the fuel reformation cylinder 2. In this case, by shifting the closing timing of the air-intake valve 26 toward the retarded angle side (by increasing the control amount of the control of the present invention for suppressing or suppressing or reducing an increase in the temperature of the reaction gas in the fuel reformation cylinder), the compression end gas temperature of the fuel reformation cylinder 2 is lowered. Further, the air-intake valve 26 may be closed at the advanced angle side relative to the timing of the piston 22 reaching the intake bottom dead point, thereby reducing the effective compression ratio of the fuel reformation cylinder 2. In this case, by shifting the closing timing of the air-intake valve 26 toward the advanced angle side (by increasing the control amount of the control of the present invention for suppressing or suppressing or reducing an increase in the temperature of the reaction gas in the fuel reformation cylinder), the compression end gas temperature of the fuel reformation cylinder 2 is lowered.

Thus, the equivalence ratio and the reaction gas temperature in the fuel reformation chamber 23 during the fuel reformation are in the reforming reaction possible range but outside the soot generation range. Also with the second adjusting operation, it is possible to suppress or reduce generation of soot in the fuel reformation chamber 23.

As a modification of the second adjusting operation, the opening timing of the exhaust valve 27 may be corrected to the advanced angle side. That is, the effective compression ratio of the fuel reformation cylinder 2 is reduced by opening the exhaust valve 27 in the middle of the compression stroke of the fuel reformation cylinder 2.

(Control of Fuel Reforming Operation)

Next, the following describes control of the fuel reforming operation using the compression end gas temperature and the soot generation lower limit temperature.

Figure 8:
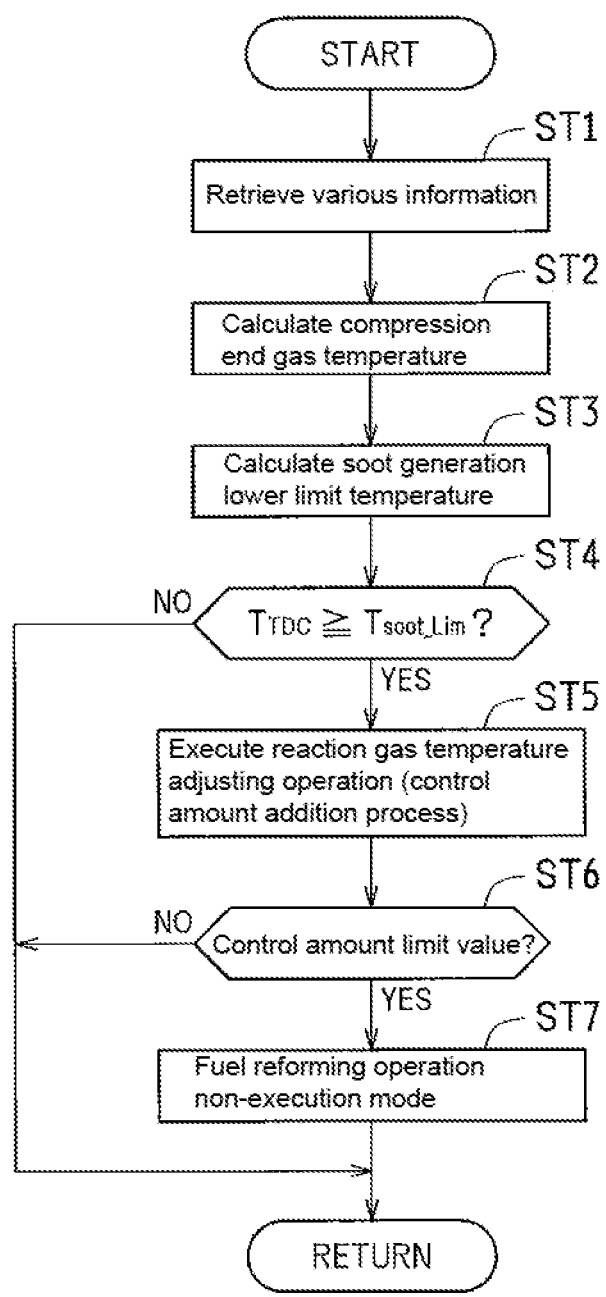
FIG. 8 A flowchart showing a control procedure for the internal combustion engine.

FIG. 8 is a flowchart showing a control procedure for the internal combustion engine 1.

First, in the step ST1, various information in the internal combustion engine 1 is retrieved. An example of the information retrieved here is output signals of the various sensors 101 to 106 and the like. Further, information on the closing timing of the air-intake valve 26 in the current control (information for calculating the current effective compression ratio of the fuel reformation cylinder 2), information on the type of the fuel (information for calculating the corrected polytropic number), and the like are also retrieved.

Then, the operation proceeds to the step ST2 to calculate (estimate) the compression end gas temperature $T_{TDC}$ with the above mentioned formula (1). In other words, the taken-in gas temperature $T_{ini}$, the effective compression ratio ε of the fuel reformation cylinder 2, the polytropic number κ, and the correction coefficient $C_{react}$ for an increase in the temperature associated with the reforming reaction are calculated as hereinabove described, and are applied to the above formula (1) to calculate the compression end gas temperature $T_{TDC}$. It should be noted that, in cases where the closing timing of the air-intake valve 26 is fixed, the effective compression ratio ε does not have to be calculated, and the effective compression ratio ε is a fixed value.

After calculating the compression end gas temperature TTDC as described above, the process proceeds to the step ST3 to calculate (estimate) the soot generation lower limit temperature $T_{soot\ \#Lim}$. As described above, the soot generation lower limit temperature $T_{soot\ \#Lim}$ is obtained as a value corresponding to the equivalence ratio in the fuel reformation chamber 23, according to a map or an arithmetic expression created based on an experiment or a simulation (a map or an arithmetic expression for setting the soot generation lower limit temperature $T_{soot\ \#Lim}$ according to the equivalence ratio in the fuel reformation chamber 23).

Then, the process proceeds to the step ST4 to compare the compression end gas temperature $T_{TDC}$ with the soot generation lower limit temperature $T_{soot\ \#Lim}$ for determining whether or not the operation range is in an operation range in which the soot may be generated. In other words, whether or not the current equivalence ratio and the current compression end gas temperature $T_{TDC}$ of the fuel reformation chamber 23 are in the soot generation range is determined. Specifically, whether or not the compression end gas temperature $T_{TDC}$ is equal to or higher than the soot generation lower limit temperature $T_{soot\ \#Lim}$ is determined.

When the compression end gas temperature $T_{TDC}$ is lower than the soot generation lower limit temperature $T_{soot\ \#Lim}$, the operation range is not in the range in which the soot may be generated, and the step ST4 results in NO. When the compression end gas temperature $T_{TDC}$ is equal to or higher than the soot generation lower limit temperature $T_{soot\ \#Lim}$, the operation range is in the range in which the soot may be generated, and the step ST4 results in YES.

When the step ST4 results in NO, the fuel reforming operation is continued without executing the reaction gas temperature adjusting operation, assuming that the reaction gas temperature adjusting operation is not necessary (no or little soot will be generated even without the reaction gas temperature adjusting operation).

When the step ST4 results in YES, the process proceeds to the step ST5, and the reaction gas temperature adjusting operation is executed. In this the step ST5, at least one of the first adjusting operation and the second adjusting operation is executed. The adjusting operation selected is determined in advance by an experiment or a simulation using the operational state, various temperatures, and the like of the internal combustion engine 1, as parameters.

When the first adjusting operation is executed, the amount of EGR gas introduced to the fuel reformation chamber 23 may be increased by increasing the opening degree of the EGR gas amount adjusting valve 73, as described hereinabove. Further, by reducing the opening degree of the bypass amount adjusting valve 75 (increasing the amount of EGR gas flowing through the EGR gas cooler 72), the temperature of the EGR gas introduced into the fuel reformation chamber 23 is lowered. Thus, the equivalence ratio and the reaction gas temperature in the fuel reformation chamber 23 during the fuel reformation are in the reforming reaction possible range but outside the soot generation range.

When the second adjusting operation is executed, the air-intake valve 26 is closed at the retarded angle side relative to the timing of the piston 22 reaching the intake bottom dead point, thereby reducing the effective compression ratio of the fuel reformation cylinder 2. Alternatively, the air-intake valve 26 may be closed at the advanced angle side relative to the timing of the piston 22 reaching the intake bottom dead point, thereby reducing the effective compression ratio of the fuel reformation cylinder 2.

For example, in cases where the equivalence ratio and the reaction gas temperature in the fuel reformation chamber 23 in the current cycle are already determined (in cases where the EGR gas amount, the EGR gas temperature, and the effective compression ratio are determined), at the time when the compression end gas temperature $T_{TDC}$ and the soot generation lower limit temperature $T_{soot\ \#Lim}$ is calculated, the reaction gas temperature adjusting operation is executed in a subsequent cycle of the fuel reformation cylinder 2. Further, in cases where the compression end gas temperature $T_{TDC}$ and the soot generation lower limit temperature $T_{soot\ \#Lim}$ are calculated (estimated), and where the compression end gas temperature $T_{TDC}$ is determined in advance as to be equal to or higher than the soot generation lower limit temperature $T_{soot\ \#Lim}$, before the equivalence ratio and the reaction gas temperature in the fuel reformation chamber 23 in the current cycle are determined, the reaction gas temperature adjusting operation is executed in the present cycle in the fuel reformation cylinder 2.

In the present embodiment, the reaction gas temperature adjusted by the reaction gas temperature adjusting operation may be outside the soot generation range within the reforming reaction possible range, and preferably adjusted to a target temperature, which is a reaction gas temperature that achieves a gas composition of the reformed fuel required by the operational state of the internal combustion engine 1, and the like. For example, in cases where the compression end gas temperature is set to be high, the concentration of hydrogen, carbon monoxide, and methane, which is a reformed fuel having high anti-knock property, can be increased even if the equivalence ratio is the same. In cases where the compression end gas temperature is set to be low, the concentration of ethane or the like, which is a reformed fuel having low anti-knock property (high ignition property), can be increased. Thus, the reaction gas temperature adjusting operation is preferably executed so as to adjust the reaction gas temperature outside the soot generation range within the reforming reaction possible range, while adjusting the reaction gas temperature to achieve the required gas composition of the reformed fuel.

While the reaction gas temperature adjusting operation is executed, the process proceeds to the step ST6 to determine whether or not the control amount of the actuator in the reaction gas temperature adjusting operation has reached the limit value. That is, when it is the first adjusting operation that is executed, the process in the step determines whether or not the opening degree of the EGR gas amount adjusting valve 73 is its limit value, i.e., whether or not the EGR gas amount adjusting valve 73 is fully opened, or opened to a limit opening degree such that further increasing the opening degree will not increase the EGR gas amount. Further, the process in the step determines whether or not the opening degree of the bypass amount adjusting valve 75 is in its reduction limit value, i.e., whether or not the opening degree of the bypass amount adjusting valve 75 is zero. That is, the process in the step determines whether or not the first adjusting operation is in the state where an increase in the reaction gas temperature in the fuel reformation cylinder cannot be suppressed or reduced any further.

If it is the second adjusting operation that is executed, the process in the step determines whether or not the timing (timing on the retarded angle side or advanced angle side) for closing the air-intake valve 26 is in its limit value. That is, the process in the step determines whether or not the second adjusting operation is in the state where an increase in the reaction gas temperature in the fuel reformation cylinder cannot be suppressed or reduced any further.

When the control amount of the actuator in the reaction gas temperature adjusting operation has not reached the limit value and the step ST6 results in NO, the process is returned as it is to continue the reaction gas temperature adjusting operation.

In the next routine, if the compression end gas temperature $T_{TDC}$ is still equal to or higher than the soot generation lower limit temperature $T_{soot\ \#Lim}$ and the step ST4 results in YES, then the process proceeds to the step ST5 to continue the reaction gas temperature adjusting operation and to execute an addition process of the control amount of the actuator in the reaction gas temperature adjusting operation. That is, the opening degree of the EGR gas amount adjusting valve 73 is further increased, if the first adjusting operation is executed. At the same time, the opening degree of the bypass amount adjusting valve 75 is reduced. In this case, only one of the opening degree of the EGR gas amount adjusting valve 73 and the opening degree of the bypass amount adjusting valve 75 may be further changed. When the second adjusting operation is executed, the closing timing of the air-intake valve 26 is changed to further reduce the effective compression ratio of the fuel reformation cylinder 2.

Under the condition that the control amount of the actuator in the reaction gas temperature adjusting operation is not reached its limit value (under condition that the step ST6 results in NO), the above operation is repeated until the compression end gas temperature $T_{TDC}$ drops below the soot generation lower limit temperature $T_{soot\ \#Lim}$. Thus, the reaction gas temperature of the fuel reformation chamber 23 drops, and the equivalence ratio and the reaction gas temperature in the fuel reformation chamber 23 during the fuel reformation will be outside the soot generation range, within the reforming reaction possible range.

On the other hand, when the control amount of the actuator in the reaction gas temperature adjusting operation reaches the limit value and the step ST6 results in YES (if the equivalence ratio and the reaction gas temperature of the fuel reformation cylinder during the fuel reforming are estimated as to be in the soot generation range even when the control amount of the control for suppressing or reducing an increase in the reaction gas temperature in the fuel reformation cylinder reaches a limit value of the controllable range, as stated in the present invention), the process proceeds to the step ST7, and the fuel reforming operation is not executed. In other words, the operation mode of the internal combustion engine 1 is in the fuel reforming operation non-execution mode. In this fuel reforming operation non-execution mode, fuel supply to the fuel reformation chamber 23 is stopped. In other words, the supply of fuel to the fuel reformation chamber 23 is stopped until the compression end gas temperature $T_{TDC}$ reaches the soot generation lower limit temperature $T_{soot\ \#Lim}$. In this case, an amount of fuel is injected from the injector 35 of the output cylinder 3 based on the required engine power. As a result, an engine power is obtained from the output cylinder 3. When the compression end gas temperature $T_{TDC}$ becomes lower than the soot generation lower limit temperature $T_{soot\ \#Lim}$ and the process returns to the normal fuel reforming operation, the control amount of the actuator in the reaction gas temperature adjusting operation is also released, and these actuators are also returned to the normal control.

Figure 4:
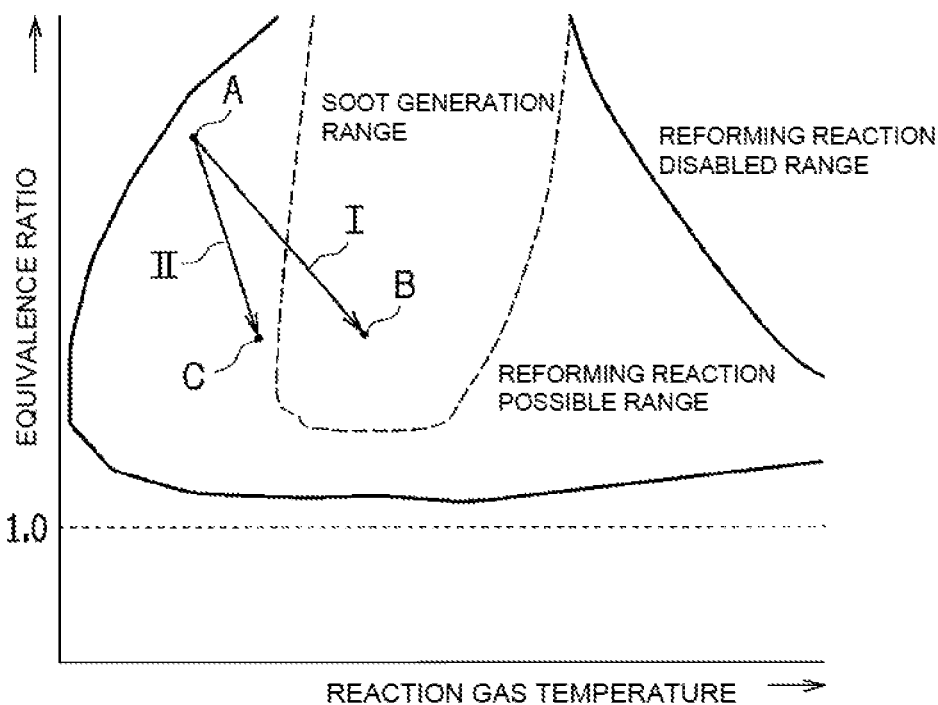
FIG. 4 A diagram showing the reforming reaction possible range, the reforming reaction disabled range, and an area in which soot is generated within the reforming reaction possible range, according to the equivalence ratio and the reaction gas temperature in the fuel reformation chamber.

Through the above operation, as shown in FIG. 4, during a medium-load operation or a high-load operation of the internal combustion engine 1, if the engine load drops and the equivalence ratio in the fuel reformation chamber 23 approaches 1 from a state where the equivalence ratio and the reaction gas temperature in the fuel reformation chamber 23 are at point A in the figure, an increase in the reaction gas temperature in the fuel reformation chamber 23 is relatively small. The change in the reaction gas temperature associated with the change in the equivalence ratio will be as shown in the arrow II in FIG. 4, for example. Therefore, the equivalence ratio and the reaction gas temperature in the fuel reformation chamber 23 will enter a state of the point C outside the soot generation range within the reforming reaction possible range. Thus, a state that generates soot-free reformed fuel, or reformed fuel containing little soot can be achieved.

The step ST4 to the step ST5 in the above described control operation correspond to an operation by the reaction gas temperature adjustment unit of the present invention which "adjusts a reaction gas temperature in the fuel reformation cylinder according to an equivalence ratio in the fuel reformation cylinder so that the equivalence ratio and the reaction gas temperature in the fuel reformation cylinder at a time of fuel reformation are in a reforming reaction possible range but outside a soot generation range, the soot generation range being defined by the equivalence ratio and the reaction gas temperature in the fuel reformation cylinder."

The control of the fuel reforming operation is executed by the ECU 100. Therefore, the functional part of the ECU 100 that executes this control corresponds to the control device described in the present invention. Further, a method of control executed by the ECU 100 corresponds to a control method referred to in the present invention.

As hereinabove described, in the present embodiment, the reaction gas temperature adjusting operation adjusts the reaction gas temperature according to the equivalence ratio of the fuel reformation chamber 23, and the equivalence ratio and the reaction gas temperature of the fuel reformation chamber 23 are set outside the soot generation range within the reforming reaction possible range. Therefore, reformed fuel can be generated while suppressing or reducing generation of soot in the fuel reformation chamber 23. As a result, a soot-caused negative effect to combustion of reformed fuel in the output cylinder 3, or emission of soot into the atmosphere can be suppressed or reduced.

Other Embodiments

Note that the above embodiment is illustrative in all respects, and is not intended to be a basis for limiting interpretation. Accordingly, the scope of the present invention is not to be interpreted solely by the foregoing embodiments, but is defined based on the description of the appended claims. Further, the technical scope of the present invention includes all changes within the meaning and scope of the appended claims.

For example, the above embodiment deals with a case where the present invention is applied to an internal combustion engine 1 for a ship, but the present invention is also applicable to an internal combustion engine in other applications (e.g., an electric power generator, a vehicle, and the like).

Further, the above embodiment deals with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment deals with a case where the fuel to be supplied to the fuel reformation chamber 23 is light oil. The present invention is not limited to this, and the fuel may be heavy oil, gasoline, or the like.

In addition, the above embodiment deals with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

Further, the above embodiment deals with a case where the engine power obtained from the output cylinder 3 is partially used as a drive source for reciprocation of the piston 22 in the fuel reformation cylinder 2. The present invention is not limited to this, and the drive source for the fuel reformation cylinder 2 may be provided separately. For example, the fuel reformation cylinder 2 and the output cylinder 3 may be separately arranged (arranged without being connected by the crankshaft 11), and the piston 22 of the fuel reformation cylinder 2 may be reciprocated by an electric motor or the like.

It should be noted that the present invention may be embodied in various other forms without departing from the spirit or essential characteristics thereof. Therefore, each of the embodiments described above and each of the embodiments described above are merely exemplary, and should not be construed as limiting the scope of the present invention. The scope of the present invention is indicated by the appended claims and is not to be limited in any way by the text of the specification. Further, the scope of the present invention encompasses all changes and modifications falling within the scope of the appended claims.

This application claims priority from Japanese Patent Application No. 2016-139575, filed in Japan on Jul. 14, 2016. The entire content of the application is hereby incorporated in the present application by reference. The entire contents of the documents cited herein are hereby incorporated in the present application by reference.

INDUSTRIAL APPLICABILITY

The present invention is applicable to control of an internal combustion engine including a fuel reformation cylinder and an output cylinder.

REFERENCE SIGNS LIST 1 internal combustion engine
2 fuel reformation cylinder (fuel reformation device)
21, 31 cylinder bore
22, 32 piston
26 air-intake valve
3 output cylinder
73 EGR gas amount adjusting valve
75 bypass amount adjusting valve
100 ECU

The invention claimed is:

1. A control device for an internal combustion engine including a fuel reformation cylinder and an output cylinder to which reformed fuel generated in the fuel reformation cylinder is supplied, the output cylinder being configured to yield an engine power by combusting the reformed fuel, the control device comprising:
   a reaction gas temperature adjustment unit configured to adjust a reaction gas temperature in the fuel reformation cylinder according to an equivalence ratio in the fuel reformation cylinder so that the equivalence ratio and the reaction gas temperature in the fuel reformation cylinder at a time of fuel reformation are in a reforming reaction possible range and outside a soot generation range, the reforming reaction possible range including a low reaction temperature limit, the soot generation range including a low soot temperature limit and defined by the equivalence ratio and the reaction gas temperature in the fuel reformation cylinder; and
   wherein based on the reaction gas temperature in the fuel reformation cylinder being lower than the low soot temperature limit and higher than the low reaction temperature limit, the fuel reformation cylinder is configured to execute a fuel reformation process.

2. The control device according to claim 1, wherein:
   the reaction gas temperature adjustment unit is configured to change a control amount of a control to suppress or reduce an increase in the reaction gas temperature of the fuel reformation cylinder caused by the equivalence ratio of the fuel reformation cylinder dropping to approach 1, and configured to increase the control amount as the equivalence ratio of the fuel reformation cylinder approaches 1.

3. The control device according to claim 1, wherein:
   the reaction gas temperature adjustment unit is configured to adjust the reaction gas temperature in the fuel reformation cylinder by adjusting at least one of an amount of an exhaust gas from the output cylinder recirculated to the fuel reformation cylinder and the temperature of the exhaust gas from the output cylinder recirculated to the fuel reformation cylinder.

4. The control device according to claim 1, wherein:
   the reaction gas temperature adjustment unit is configured to adjust the reaction gas temperature in the fuel reformation cylinder, by adjusting an effective compression ratio of the fuel reformation cylinder.

5. The control device according to claim 2, wherein:
   the fuel reformation process in the fuel reformation cylinder is not executed, when the control amount of the control to suppress or reduce an increase in the reaction gas temperature in the fuel reformation cylinder reaches a limit value of a controllable range, if the equivalence ratio and the reaction gas temperature of the fuel reformation cylinder at the time of fuel reformation are estimated to be in the soot generation range.

6. A control method for an internal combustion engine including a fuel reformation cylinder and an output cylinder to which reformed fuel generated in the fuel reformation cylinder is supplied, the output cylinder being configured to yield an engine power by combusting the reformed fuel, the control method comprising:

adjusting a reaction gas temperature in the fuel reformation cylinder based on an equivalence ratio in the fuel reformation cylinder until the equivalence ratio and the reaction gas temperature in the fuel reformation cylinder at a time of fuel reformation are within a reforming reaction possible range and outside a soot generation range, the reforming reaction possible range including a low reaction temperature limit, the soot generation range including a low soot temperature limit and defined by the equivalence ratio and the reaction gas temperature in the fuel reformation cylinder; and executing a fuel reformation process based on:
   the reaction gas temperature in the fuel reformation cylinder being lower than the low soot temperature limit; and
   the reaction gas temperature in the fuel reformation cylinder being higher than the low reaction temperature limit.

7. The control method according to claim 6, further comprising:
   determining the reaction gas temperature in the fuel reformation cylinder; and
   performing a comparison based on the reaction gas temperature in the fuel reformation cylinder and the low soot temperature limit; or
   performing a comparison based on the reaction gas temperature in the fuel reformation cylinder and the low reaction temperature limit.

\* \* \* \* \*